Aug. 3, 1926.
J. W. PITTS
1,594,556
MECHANICAL MOVEMENT
Filed Feb. 23, 1924    3 Sheets-Sheet 2
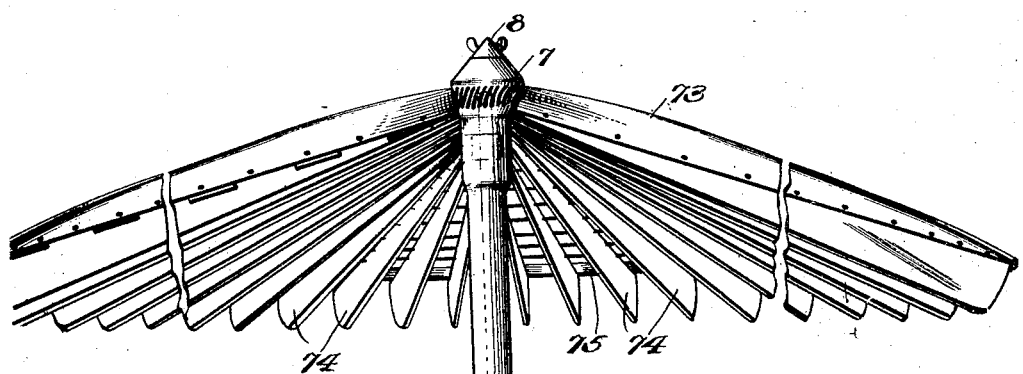
Fig. 6.
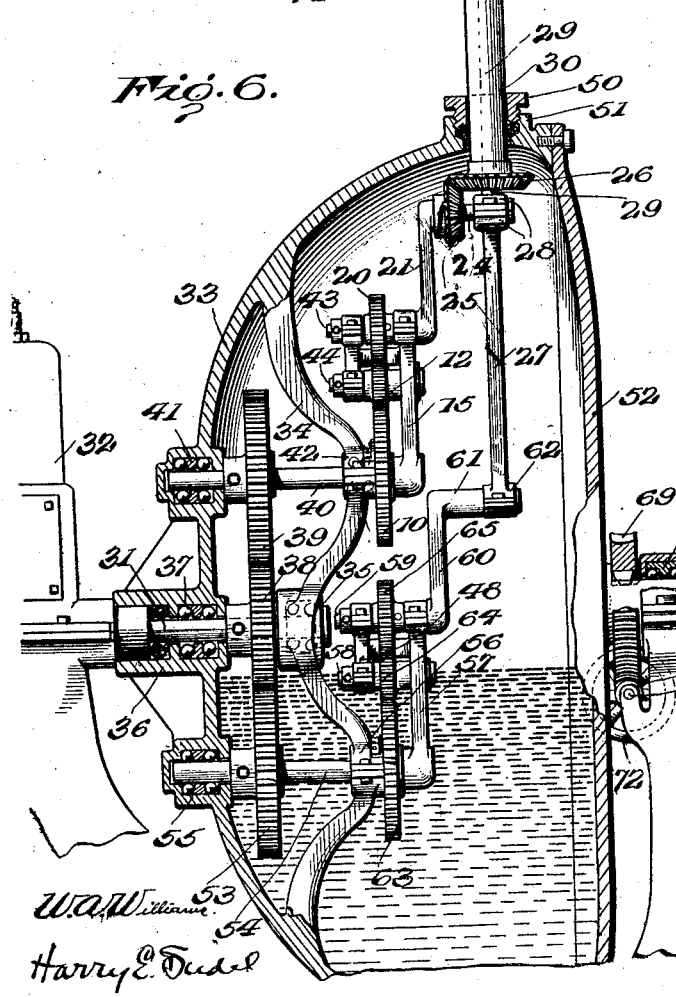
Fig. 7.
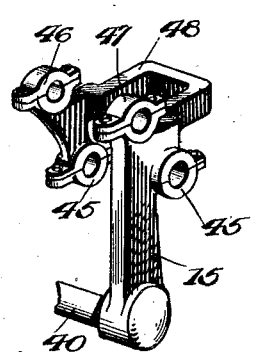
INVENTOR
J. W. Pitts,
BY
ATTORNEYS

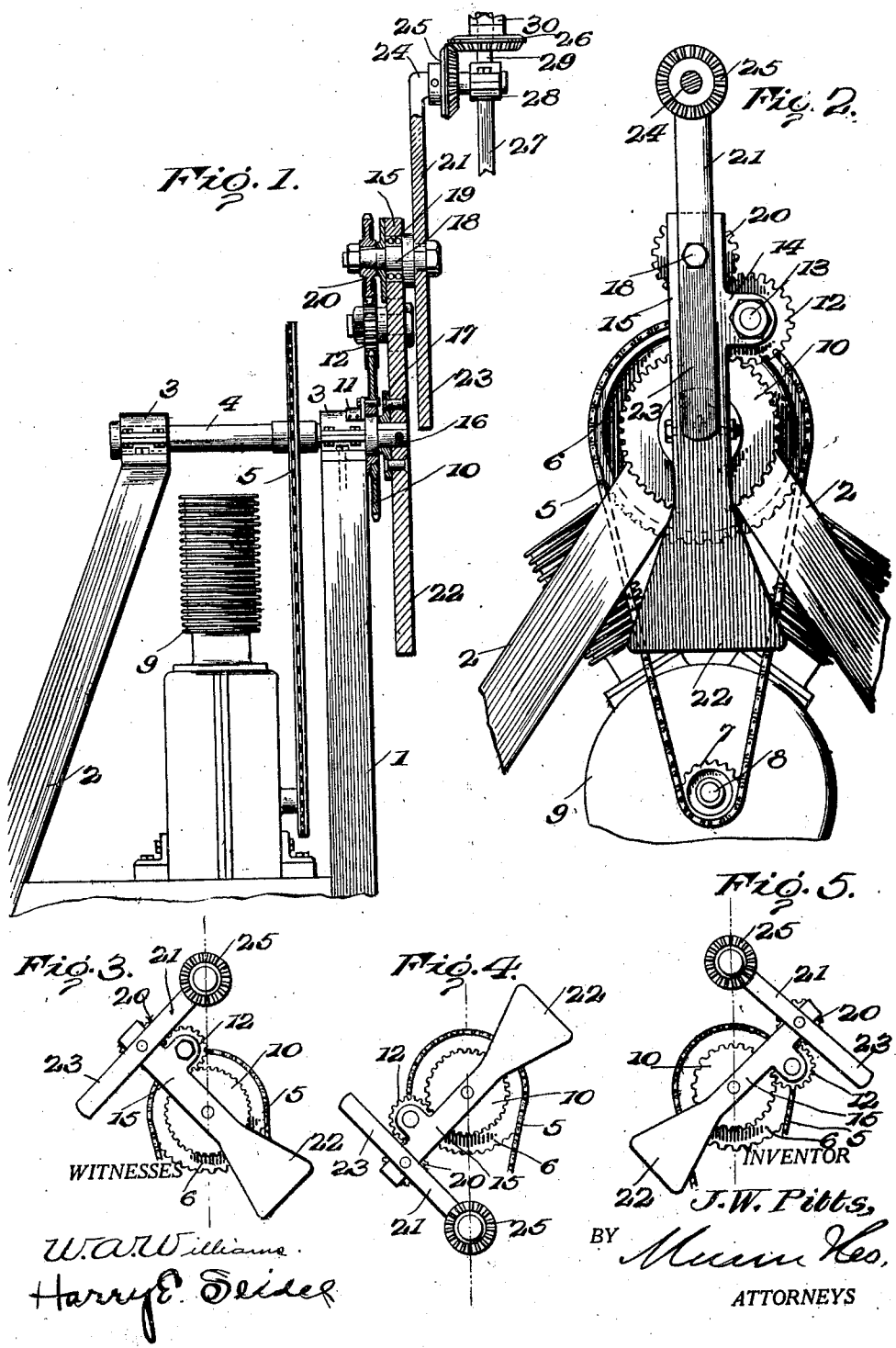

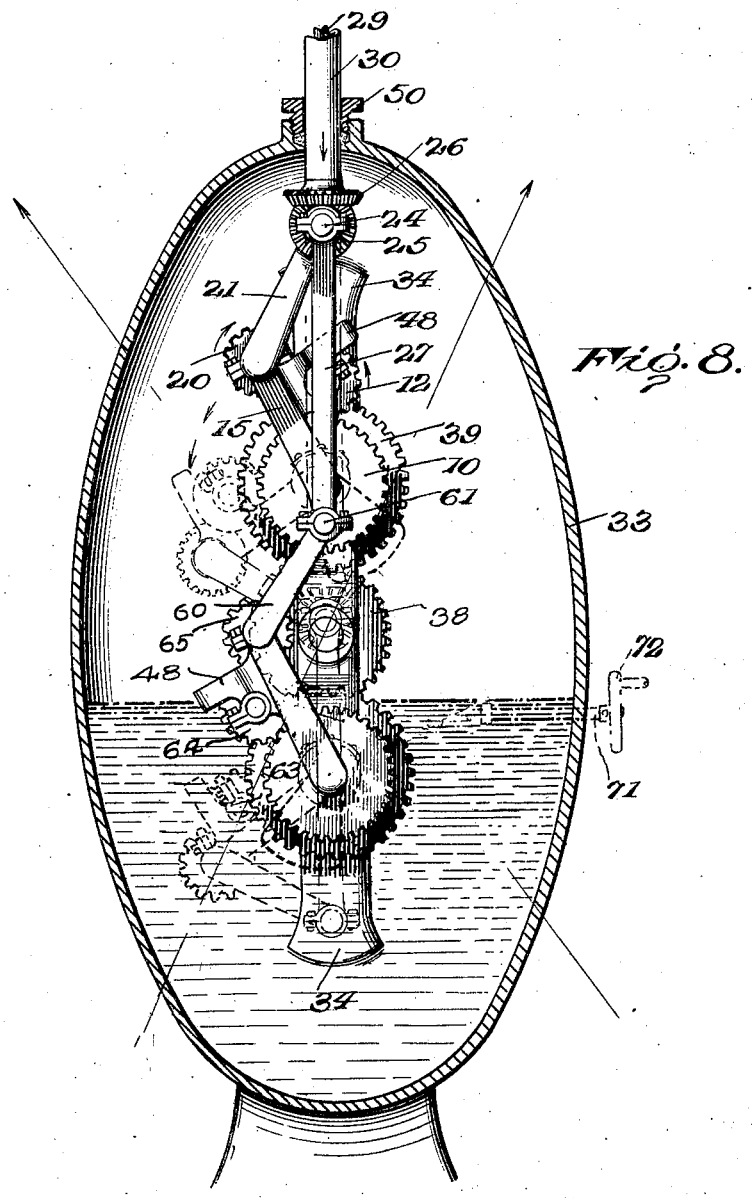

Patented Aug. 3, 1926.

1,594,556

UNITED STATES PATENT OFFICE.

JOHN W. PITTS, OF DETROIT, MICHIGAN, ASSIGNOR TO PITTS MANUFACTURING COMPANY, OF BISBEE, ARIZONA, A CORPORATION.

MECHANICAL MOVEMENT.

Application filed February 23, 1924. Serial No. 694,693.

This invention relates to a mechanical movement for converting a rotary motion into a reciprocatory motion.

An object of the invention is the provision of a device for converting rotary into reciprocatory motion and by which an element of the device may be reciprocated at high speed and with a long stroke.

A further object of the invention is the provision of a device for converting a rotary motion into a reciprocatory motion for reciprocating a shaft and for rotating the same.

This invention will be best understood from a consideration of the following detailed description, in view of the accompanying drawings forming a part of the specification; nevertheless it is to be understood that the invention is not confined to the disclosure, being susceptible of such changes and modifications which shall define no material departure from the salient features of the invention as expressed in the appended claims.

In the drawings:

Figure 1 is a side elevation partly in section of a device for converting a rotary motion into a reciprocating motion.

Figure 2 is a fragmentary view showing the front elevation of the device.

Figure 3 is a fragmentary view of the device disclosing a different position of the cooperating arms in which a rotary motion is converted into a reciprocating motion.

Figures 4 and 5 show views similar to the view shown in Figure 3 disclosing various positions of the cooperating arms.

Figure 6 is a vertical section showing the device illustrated in Figures 1 to 5 inclusive as applied for rotating and reciprocating a propeller.

Figure 7 is a fragmentary view in perspective of a revolving arm which carries an idling gear.

Figure 8 is a vertical section taken at right angles to the section shown in Figure 6 disclosing the front view of the device for producing the mechanical movement.

Referring more particularly to the drawings, 1 and 2 designate standards of any type, having bearings 3 at their upper ends for carrying a shaft 4. The shaft is driven through a chain 5, a sprocket 6 on the shaft 4 and a sprocket 7 upon shaft 8 driven by an engine 9.

A stationary gear 10 is rigidly connected in any approved manner, or as more particularly shown at 11, to the bearing 3 at the upper end of standard 1 and is adapted to mesh with an idler 12 mounted for rotation on the spindle 13 carried by a bracket 14 of a revolving arm 15. The arm 15 serves as a crank and may be formed integrally with the reduced end 16 of shaft 4, or connected to the same, as shown in Figure 1, through a flanged collar 17 keyed to the shaft 4, with the flange of the collar being riveted to the rotating arm 15.

The counter shaft 18 mounted in ball bearings 19 in the upper end of the crank arm 15 has a gear 20 keyed thereon at one end while the other end of the shaft is rigidly connected with a second crank arm 21. It will be noted that arm 15 has a radial extension 22 forming a weight or balance. Arm 21 likewise has a radial extension 23 forming a weight or balance for the mechanism. The upper end of crank arm 21 is provided with a crank 24 upon which is pinned a bevelled gear 25. This gear is in mesh with a gear 26 rigidly pinned to a hollow shaft 30 which is adapted to be rotated through the rotation of gear 26 and reciprocated in a manner which will be presently described. A rod 29 is likewise reciprocated and is connected to a reciprocating link 27 by means of flanged connections 28 and the hollow shaft 30 revolves on rod 29. The link 27 may be formed integrally with the axle or reciprocating rod 29 and a bearing provided in an enlargement at 28 to receive the crank 24.

The operation of the device as disclosed by Figures 1 to 5 inclusive is as follows:

Rotation is transmitted to the shaft 4 from the power plant by means of the sprockets 6 and 7 and the chain 5. The rotation of said shaft causes rotation of crank arm 15. As said arm rotates it carries the idler gear 12 around the periphery of the stationary gear 10 and since the gear 12 meshes with gear 10 gear 12 will be rotated, simultaneously rotating gear 20 which is in mesh with gear 12. The rotation of gear 20 revolves shaft 18 and likewise crank arm 21 so that as the arm 15 is revolved shaft 18 is revolved about the center of shaft 4 while arm 21 is revolved about shaft 18. This would ordinarily tend to cause gear 25 to be revolved about the center of the shaft of gear 10 and about shaft 4, but since the length of the arm 21 is equal to the length of the crank arm 15 and the combination of rotary movements between the gears 12 and 20, the center of gear 25 and consequently the shaft 24 will be moved through an imaginary vertical line passing through the center of shaft 4 and crank 24, as shown in Figures 2 to 5 inclusive, whereby a radial motion is converted into a reciprocatory movement. The ratio between the gear 10 and gear 20 is 2:1. As gear 25 is rigidly connected to crank 24 and is revolved around a center which passes through the center of the shaft 18, the gear will cause rotation of gear 26 as said gear travels over the teeth of gear 25 thereby causing rotation of the hollow shaft 30 on the axle 29.

Some means is required to maintain the rod 29 against revolution in a vertical plane and it will be therefore necessary to provide bearings for either the upper or lower end of the link 27 or bearings for both the link and rod in order to maintain the rod in a vertical position, and such a means for supporting the free end of the rod 29 is shown more particularly in Figures 6, 7 and 8.

In Figures 6 and 8 are shown two sets of pairs of crank arms cooperatively revolved for supporting and reciprocating the rod 29; in this instance a shaft 31, which is directly coupled to an internal combustion engine 32 rotatably supports a housing 33. A bracket 34 integrally formed with said housing has a bearing 35 to receive the outer end of the shaft 31 and a sleeve 36 projecting outwardly from the rear face of the housing carries roller bearings 37 whereby the housing is supported on the shaft. A gear 38 is rigidly connected with shaft 31 and rotated thereby. A gear 39 in mesh with gear 38 is rigidly connected with a shaft 40 mounted in bearings 41 and 42, respectively, formed in a boss in the outer wall of the casing 33 and upon the bracket 34.

Upon the outer end of shaft 40 and beyond the bearing 42 is mounted a gear 10 which is rigid with bracket 34. Shaft 40 revolves in a central opening in gear 10. The construction disclosed in Figures 6 and 8 and located between the shaft 40 and the gear 26 is identical with construction shown in Figures 1 to 5 inclusive with the exception that the weights 22 and 23 in the present instance are eliminated and crank arm 15 is formed integrally with shaft 40 and crank arm 21 is formed integrally with shaft 43, the shaft 43 replacing the countershaft 18 of Figures 1 to 5 inclusive. Gear 10 meshes with gear 12 which is mounted for rotary motion on pintle 44 which in turn is mounted in alined bearings 45 provided in the bracket of the arm 15. Bearings 46 and 47 carry the shaft 43. It will be noted that bearing 47 is formed at the upper end of arm 15 while bearing 46 is formed upon the U-shaped arm of a bracket 48 which is integrally formed at the upper end of crank arm 15. Gear 25 meshes with gear 26 and hollow shaft 30, as has been described, being rigidly connected with gear 26, is revolved by the rotation of said gear. The link or rod 27 is connected by means of flanges 28 to rod 29, with the flanges embracing the crank 24. The hollow shaft 30 passes through a packing gland 50 formed in a boss 51 at the upper end of the casing 33. A cover 52 forms a closure for the front end of said casing.

The construction just described with reference to the gear 39, gear 10, crank arms 15 and 21 is duplicated below this structure so that a gear 53, mounted on a shaft 54 meshes with gear 38 and is rotated thereby. Shaft 54 is mounted in bearings 55 and 56 formed respectively on the outer wall of the casing 33 and the bracket 34. Shaft 54 is provided with a crank arm 57 which carries at its upper end a bracket 48 and provided with bearings to support the pintle 58 and shaft 59. A crank arm 60 is integrally formed with the shaft 59 and is provided with a crank 61 to which is pivotally connected at 62 the lower end of the link 27. A gear 63 on shaft 54 is rigidly connected with the lower end of the bracket adjacent the bearings 56 and maintained against rotation. A gear 64 in mesh with gear 63 revolves in a planetary manner around the gear 63 and being in mesh with said gear is rotated thereby. A gear 65 on shaft 59 is in mesh with gear 64 and is revolved by the rotation of gear 64.

The closure 52 of the casing 33 is provided with a stub shaft 66 mounted in bearings 67 upon the upper end of a bracket arm 68. This arm is connected to the base which supports the engine 32 or is integrally formed with the engine housing. A worm gear 69 is keyed to the stub shaft 66, and a worm 70 is in mesh with gear 69. The worm is carried by a shaft 71 having an operating wheel 72. It will be seen that by rotation of the wheel 72 and shaft 71 that gear 70 will rotate gear 69 and thereby revolve the casing 33 and change the angular position of the link 27 and likewise the hollow shaft 30.

Upon the upper end of shaft 30 is secured a propeller 73 which has vanes 74 adapted to close or open the spaces 75 by the rotation of said propeller. This propeller is described and claimed in a copending application filed of even date and forms no part of the present invention.

It will be seen that by rotation of the wheel 72, the casing 33 will be revolved upon its axis and vary the angular position of the longitudinal axis of said casing and likewise the angular position of the link 27.

This varies the angular position of the propeller 73 from its normal vertical position at any time desired when the propellers are employed for driving an aeroplane.

What I claim is:

1. A mechanism for converting rotary into reciprocatory motion comprising a shaft, means for driving said shaft, a crank arm rigid with said shaft, a gear rigid with a fixed support and axially alined with the shaft, a planetary gear revolubly mounted on the crank arm and in mesh with the fixed gear, a shaft revolubly mounted on the crank arm, a gear rigid with the last mentioned shaft and in mesh with the planetary gear, a crank arm rigid with the last mentioned shaft, a crank pin rigid with the second crank arm, a shaft, and means operatively connecting the shaft with the crank pin whereby said shaft is rotated and reciprocated.

2. A mechanism for converting rotary into reciprocatory motion comprising a shaft, means for driving said shaft, a crank arm rigid with said shaft, a gear rigid with a fixed support and axially alined with the shaft, a planetary gear revolubly mounted on the crank arm and in mesh with the fixed gear, a shaft revolubly mounted on the crank arm, a gear rigid with the last mentioned shaft and in mesh with the planetary gear, a crank arm rigid with the last mentioned shaft, a crank pin rigid with the second crank arm, a gear rigid with the crank pin, a hollow shaft, and a gear in mesh with the last mentioned gear and rigid with the hollow shaft.

3. A mechanism for converting rotary into reciprocatory motion comprising a shaft, means for driving said shaft, a crank arm rigid with said shaft, a gear rigid with a fixed support and axially alined with the shaft, a planetary gear revolubly mounted on the crank arm and in mesh with the fixed gear, a shaft revolubly mounted on the crank arm, a gear rigid with the last mentioned shaft and in mesh with the planetary gear, a crank arm rigid with the last mentioned shaft, a crank pin rigid with the second crank arm, a gear rigid with the crank pin, a hollow shaft, a gear in mesh with the last mentioned gear and rigid with the hollow shaft, and an axle telescoped within the hollow shaft and supported by the crank pin.

4. A mechanism for converting rotary into reciprocatory motion comprising a pair of shafts, means for simultaneously driving said shafts, a crank arm rigid with each shaft, a gear axially alined with each shaft and rigid with a fixed support, a planetary gear revolubly mounted on each crank arm and in mesh with the respective rigid gears, a shaft revolubly mounted on each arm, a gear rigid with each of the last mentioned shafts and in mesh with the adjacent planetary gear, a crank arm rigid with each of the last mentioned shafts, and means connecting the last mentioned crank arms.

5. A mechanism for converting rotary into reciprocatory motion comprising a pair of shafts, means for simultaneously driving said shafts, a crank arm rigid with each shaft, a gear axially alined with each shaft and rigid with a fixed support, a planetary gear revolubly mounted on each crank shaft and in mesh with the respective rigid gears, a shaft revolubly mounted on each arm, a gear rigid with each of the last mentioned shafts and in mesh with the adjacent planetary gear, a crank arm rigid with each of the last mentioned shafts, a crank pin rigid with each of the second mentioned crank arms, and a gear rigid with one of the crank pins, means connecting the second mentioned crank pins, a shaft carried by the connecting means and provided with a gear in mesh with the gear on one of the second mentioned crank pins.

6. A mechanism for converting rotary into reciprocatory motion comprising a pair of shafts, means for simultaneously driving said shafts, a crank arm rigid with each shaft, a gear axially alined with each shaft and rigid with a fixed support, a planetary gear revolubly mounted on each crank shaft and in mesh with the respective rigid gears, a shaft revolubly mounted on each arm, a gear rigid with each of the last mentioned shafts and in mesh with the adjacent planetary gear, a crank arm rigid with each of the last mentioned shafts, a crank pin rigid with each of the second mentioned crank arms, a gear rigid with one of the crank pins, a rod having pivotal connections with the crank pins, an axle carried by the rod, a hollow shaft on the axle, and means operatively connecting the shaft with the gear on one of the last mentioned crank pins.

7. A mechanism for converting rotary into reciprocatory motion comprising a pair of shafts, means for simultaneously driving said shafts, a crank arm rigid with each shaft, a gear axially alined with each shaft and rigid with a fixed support, a planetary gear revolubly mounted on each crank shaft and in mesh with the respective rigid gears, a shaft revolubly mounted on each arm, a gear rigid with each of the last mentioned shafts and in mesh with the adjacent planetary gear, a crank arm rigid with each of the last mentioned shafts, a crank pin rigid with each of the second mentioned crank arms, a gear rigid with one of the crank pins, a rod having pivotal connections with the crank pins, a hollow shaft revolubly mounted on the rod, and a gear on the shaft in mesh with the gear on the crank pin.

8. A mechanism for converting rotary into reciprocatory motion comprising a drive shaft, means for driving said shaft, a housing rotatably mounted on the shaft, a pair of driven shafts mounted within the housing, means in the housing connected with the drive shaft for simultaneously driving the pair of shafts, a crank arm rigid with each shaft, a gear axially alined with each shaft and rigid with a fixed support, a planetary gear revolubly mounted on each crank shaft and in mesh with the respective rigid gears, a shaft revolubly mounted on each arm, a gear rigid with each of the last mentioned shafts and in mesh with the adjacent planetary gear, a crank arm rigid with each of the last mentioned shafts, and means connected to the last mentioned crank arm and adapted to be reciprocated thereby.

9. A mechanism for converting rotary into reciprocatory motion comprising a drive shaft, means for driving said shaft, a housing rotatably mounted on the shaft, a pair of driven shafts mounted within the housing, means in the housing connected with the drive shaft for simultaneously driving the pair of shafts, a crank arm rigid with each shaft, a gear axially alined with each shaft and rigid with a fixed support, a planetary gear revolubly mounted on each crank shaft and in mesh with the respective rigid gears, a shaft revolubly mounted on each arm, a gear rigid with each of the last mentioned shafts and in mesh with the adjacent planetary gear, a crank arm rigid with each of the last mentioned shafts, a crank pin rigid with each of the second mentioned arms, a gear rigid with one of the crank pins, a rod having pivotal connection with the crank pins, a hollow shaft revolubly mounted on the rod, a gear on the shaft in mesh with the gear on the crank pin, a bearing in the housing for supporting the hollow shaft during reciprocation and rotation.

10. A mechanism for converting rotary into reciprocatory motion comprising a drive shaft, means for driving said shaft, a housing rotatably mounted on the shaft, a pair of driven shafts mounted within the housing, means in the housing connected with the drive shaft for simultaneously driving the pair of shafts, a crank arm rigid with each shaft, a gear axially alined with each shaft and rigid with a fixed support, a planetary gear revolubly mounted on each crank shaft and in mesh with the respective rigid gears, a shaft revolubly mounted on each arm, a gear rigid with each of the last mentioned shafts and in mesh with the adjacent planetary gear, a crank arm rigid with each of the last mentioned shafts, a crank pin rigid with each of the second mentioned arms, a gear rigid with one of the crank pins, a rod having pivotal connection with the crank pins, a hollow shaft revolubly mounted on the rod, a gear on the shaft in mesh with the gear on the crank pin, a bearing in the housing for supporting the hollow shaft during reciprocation and rotation, and means for rotating the casing.

11. In a mechanism for converting rotary into reciprocatory motion, a drive shaft, a housing rotatably mounted on the drive shaft, means for rotating said housing independently of the drive shaft, a shaft projecting through said housing, and means connected with the drive shaft for rotating and reciprocating the second mentioned shaft.

12. In a mechanism for converting rotary into reciprocatory motion, a drive shaft, a housing rotatably mounted on the drive shaft, a second shaft projecting radially through said housing, means connected with the drive shaft for rotating and reciprocating the second mentioned shaft, and means for rotating said housing independently of the drive shaft for causing oscillation of the second shaft.

13. In a mechanism for converting rotary into reciprocatory motion, a drive shaft, a housing rotatably mounted on the drive shaft, an axle projecting through the housing, means connecting the drive shaft for causing reciprocation of the axle, a hollow shaft carried by the axle, and means connected with the reciprocating means for the axle for causing rotation of the shaft.

14. In a mechanism for converting rotary into reciprocatory motion, a drive shaft, a housing rotatably mounted on the drive shaft, an axle projecting through the housing, means connecting the drive shaft for causing reciprocation of the axle, a hollow shaft carried by the axle, means connected with the reciprocating means for the axle for causing rotation of the shaft, and means for rotating said housing independently of the drive shaft for causing oscillation of the hollow shaft and axle.

JOHN W. PITTS.